(12) United States Patent
An et al.

(10) Patent No.: US 8,350,800 B2
(45) Date of Patent: Jan. 8, 2013

(54) DISPLAY DEVICE

(75) Inventors: Byunghyun An, Pyeongtaek-si (KR);
Minchul Kim, Pyeongtaek-si (KR);
Hoon Hur, Pyeongtaek-si (KR);
Bupsung Jung, Pyeongtaek-si (KR);
Seungse Kim, Pyeongtaek-si (KR);
Myounghwa Ko, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/795,349

(22) Filed: Jun. 7, 2010

(65) Prior Publication Data

US 2010/0315446 A1    Dec. 16, 2010

Related U.S. Application Data

(60) Provisional application No. 61/187,270, filed on Jun. 15, 2009, provisional application No. 61/233,890, filed on Aug. 14, 2009.

(30) Foreign Application Priority Data

Jun. 16, 2009   (KR) .................. 10-2009-0053260
Nov. 24, 2009   (KR) .................. 10-2009-0113710

(51) Int. Cl.
*G09G 3/36* (2006.01)
(52) U.S. Cl. ............. 345/102; 349/65; 362/612
(58) Field of Classification Search ............ 345/102; 349/65; 362/612, 613
See application file for complete search history.

(56) References Cited

U.S. PATENT DOCUMENTS 7,505,024 B2    3/2009   Yoo et al.
7,553,060 B2 *  6/2009   Tanabe ................... 362/612
(Continued)

FOREIGN PATENT DOCUMENTS

JP    2005-259361 A    9/2005
(Continued)

OTHER PUBLICATIONS

Co-pending U.S. Appl. No. 12/796,198, filed Jun. 8, 2010.
(Continued)

*Primary Examiner* — Amare Mengistu
*Assistant Examiner* — Dmitriy Bolotin
(74) *Attorney, Agent, or Firm* — Birch, Stewart, Kolasch & Birch, LLP

(57) ABSTRACT

The present invention provides a display device. The display device includes: a backlight unit that is divided into a plurality of blocks and driven for each of the divided blocks and includes a plurality of optical assemblies; a display panel positioned on the top of the backlight unit; a controller that outputs a local dimming value for each of blocks corresponding to the blocks of the backlight unit depending on an image displayed in the display panel; and a BLU driver that controls the brightness of the blocks of the backlight unit by using the local dimming value for each block, wherein the optical assembly includes a substrate; a plurality of light sources that are positioned and emit light; and a light guide plate including a light input unit including an incident surface into which light is inputted through the side from the light source and a light emitting unit emitting the inputted light to the top, and wherein at least some portions of two adjacent optical assemblies among the plurality of optical assemblies are superimposed on each other, and the BLU driver receives the local dimming value for each block and outputs a plurality of driving signals and the blocks of the backlight unit are driven in the unit of the divided groups by being divided into a plurality of scan groups.

18 Claims, 11 Drawing Sheets

U.S. PATENT DOCUMENTS

| | | | |
|---|---|---|---|
| 2005/0168967 A1* | 8/2005 | Kao et al. | 362/27 |
| 2006/0221638 A1* | 10/2006 | Chew et al. | 362/613 |
| 2007/0290622 A1* | 12/2007 | Furukawa | 315/161 |
| 2008/0204397 A1* | 8/2008 | Jang et al. | 345/102 |
| 2008/0205078 A1* | 8/2008 | Karlicek et al. | 362/612 |
| 2008/0205080 A1* | 8/2008 | Erchak et al. | 362/613 |
| 2009/0122227 A1* | 5/2009 | Hong et al. | 349/64 |
| 2009/0207629 A1* | 8/2009 | Fujiyama et al. | 362/613 |
| 2009/0273733 A1* | 11/2009 | Shimura et al. | 349/65 |
| 2009/0290097 A1* | 11/2009 | Kim et al. | 349/65 |
| 2009/0303410 A1* | 12/2009 | Murata et al. | 349/58 |
| 2009/0316074 A1* | 12/2009 | Tomiyoshi | 349/65 |
| 2010/0045898 A1* | 2/2010 | Lee et al. | 349/65 |
| 2010/0110339 A1* | 5/2010 | Ajichi et al. | 349/65 |
| 2010/0134521 A1* | 6/2010 | Hente et al. | 345/690 |
| 2010/0134522 A1* | 6/2010 | De Rijck | 345/690 |
| 2010/0182767 A1* | 7/2010 | Chen et al. | 362/97.1 |

FOREIGN PATENT DOCUMENTS

| | | |
|---|---|---|
| JP | 2007-293339 A | 11/2007 |
| JP | 2008-108623 A | 5/2008 |
| JP | 2008-192395 A | 8/2008 |
| JP | 2009-186523 A | 8/2009 |
| KR | 10-2005-0067903 A | 7/2005 |
| KR | 10-2005-0112661 A | 12/2005 |
| KR | 10-2007-0002920 A | 1/2007 |
| KR | 10-2008-0070214 A | 7/2008 |
| KR | 10-2008-0078210 A | 8/2008 |
| KR | 10-2009-0040673 A | 4/2009 |
| KR | 10-2009-0109766 A | 10/2010 |

OTHER PUBLICATIONS

Co-pending U.S. Appl. No. 13/100,950, filed May 4, 2011.

* cited by examiner

DISPLAY DEVICE

CROSS REFERENCE TO RELATED APPLICATIONS

This nonprovisional application claims the benefit of U.S. Provisional Application Nos. 61/187,270 filed on Jun. 15, 2009 and 61/233,890 filed on Aug. 14, 2009 and to Patent Application Nos. 10-2009-0113710 and 10-2009-0053260 filed in Korea, on Nov. 24, 2009 and Jun. 16, 2009 respectively. The entire contents of all of the above applications is hereby incorporated by reference into the present application.

BACKGROUND OF TEE INVENTION

1. Field of the Invention

The present invention relates to a display device, and more particularly, a method of driving a backlight unit provided in a display device.

2. Description of the Related Art

With development of an information society, a requirement for a display device is also being increased in various forms. Various display devices such as a liquid crystal display device (LCD), a plasma display panel (PDP), an electro luminescent display (ELD), a vacuum fluorescent display (VFD), etc. have been recently researched and used by complying with the requirement.

Among them, a liquid crystal display panel of the LCD includes a liquid crystal layer, and a TFT substrate and a color filter substrate that face each other with the liquid crystal layer interposed therebetween. The liquid crystal panel can display an image by using light provided from a backlight unit since it has no self luminescent power.

SUMMARY OF THE INVENTION

An object of the present invention is to provide a method of efficiently driving a backlight unit provided in a display device and a display device using the same.

According to an embodiment of the present invention, a display device includes: a backlight unit that is divided into a plurality of blocks and driven for each of the divided blocks and includes a plurality of optical assemblies; a display panel positioned on the top of the backlight unit; a controller that outputs a local dimming value for each block corresponding to the brightness of each block of the backlight unit depending on an image displayed in the display panel; and a BLU driver that controls the brightness of the blocks of the backlight unit by using the local dimming value for each block, wherein the optical assembly includes a substrate; a plurality of light sources that are positioned on the substrate and emit light; and a light guide plate including a light input unit including an incident surface into which light is inputted through the side from the light source and a light emitting unit emitting the inputted light to the top, and wherein at least some portions of two adjacent optical assemblies among the plurality of optical assemblies are superimposed on each other, and the BLU driver receives the local dimming value for each block and outputs a plurality of driving signals and the blocks of the backlight unit are driven in the unit of the divided groups by being divided into a plurality of scan groups.

According to another embodiment of the present invention, a display device includes: a backlight unit that is divided into a plurality of blocks and driven for each of the divided blocks and includes at least one optical assembly; a display panel positioned on the top of the backlight unit; a controller that outputs a local dimming value for each block corresponding to the brightness of each block of the backlight unit depending on an image displayed in the display panel; and a BLU driver that controls the brightness of the blocks of the backlight unit by using the local dimming value for each block, wherein the optical assembly includes a plurality of light sources; and a light guide plate including a light input unit including an incident surface into which light is inputted through the side from the light source and a light emitting unit emitting the inputted light to the top, and the blocks of the backlight unit are driven in the unit of the divided groups by being divided into a plurality of scan groups, and wherein the BLU driver includes a driving unit, and the driving unit includes a control unit receiving the local dimming value for each block from the controller and a plurality of driver ICs outputting a driving signal for controlling the brightness of two or more blocks.

According to yet another embodiment of the present invention, a display device includes: a backlight unit that is divided into a plurality of blocks and driven for each of the divided blocks and includes at least one optical assembly; a display panel positioned on the top of the backlight unit; a controller that outputs a local dimming value for each block corresponding to the brightness of each block of the backlight unit depending on an image displayed in the display panel; and a BLU driver that controls the brightness of the blocks of the backlight unit by using the local dimming value for each block, wherein the optical assembly includes a substrate; a plurality of light sources that are positioned on the substrate and emit light; and a light guide plate including a light input unit including an incident surface into which light is inputted through the side from the light source and a light emitting unit emitting the inputted light to the top, and wherein the light guide plate includes a part of which the thickness is gradually reduced from one portion to the other portion, and the BLU driver receives the local dimming value for each block and outputs a plurality of driving signals and the blocks of the backlight unit are driven in the unit of the divided groups by being divided into a plurality of scan groups.

According to an embodiment of the present invention, it is possible to reduce the thickness of a display device by providing light to a display panel using a module-type backlight unit constituted by a plurality of light guide plates and improve a contrast of a display image by using a partial driving scheme such as local dimming.

Further, by sequentially driving a plurality of light sources provided in the backlight unit in the group unit, it is possible to prevent deterioration of an image such as a motion blur phenomenon, etc.

DETAILED DESCRIPTION OF THE PREFERRED EMBODIMENTS

Hereinafter, embodiments of the present invention will be described with reference to the accompanying drawings.

Hereinafter, the described embodiments may be modified in various different ways, all without departing from the spirit or scope of the present invention. The embodiments of the present invention are provided so that those skilled in the art may more completely understand the present invention. Accordingly, the shape, the size, etc., of elements in the figures may be exaggerated for explicit comprehension.

Figure 1:
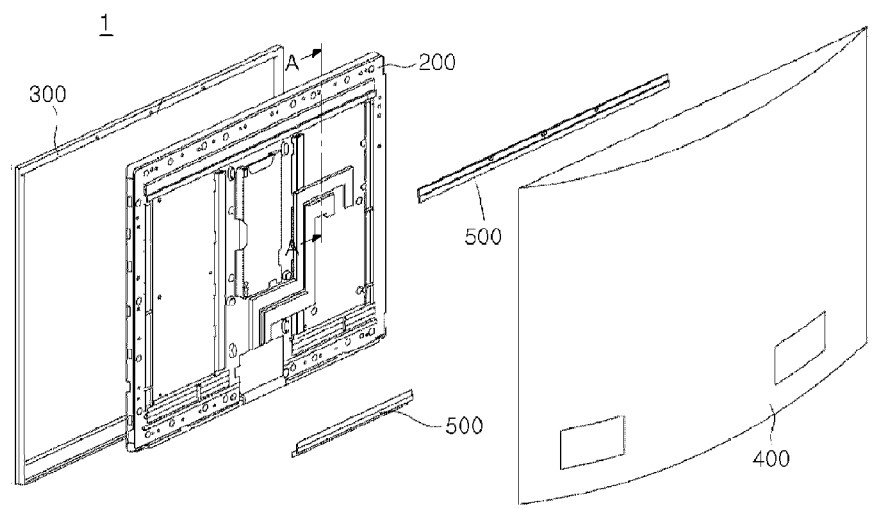
FIG. 1 is an exploded perspective view showing a configuration of a display device.

FIG. 1 is an exploded perspective view showing an overall configuration of a display device.

Referring to FIG. 1, the display device 1 may include a display module 200, a front cover 300 and a back cover 400 covering the display module 200, and a fixation member 500 for fixing the display module 200 to the front cover 300 and/or the back cover 400.

One portion of the fixation member 500 is fixed to the front cover 300 by a fastening member such as a screw, etc. and the other side of the fixation member 500 fixes the display module 200 to the front cover 300 by supporting the display module 200 on the front cover 300.

In the embodiment, the fixation member 500 has a plate shape that extends lengthily in one direction as an example, but an additional fixation member 500 is not provided and the display module 200 may be configured to be fixed to the front cover 300 or the back cover 400 by the fastening member.

Figure 2:
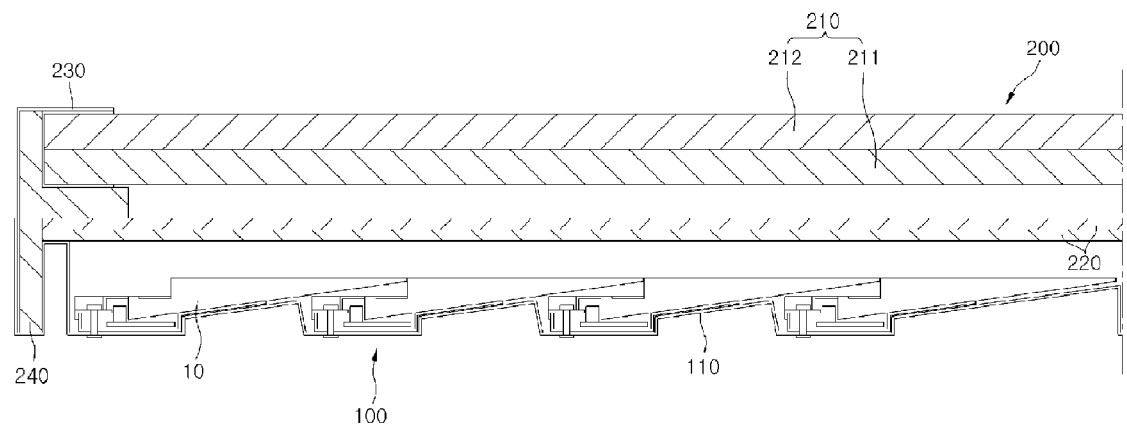
FIG. 2 is a cross-sectional view showing an embodiment of a configuration of a display module.

FIG. 2 is a cross-sectional view of an embodiment of a configuration of a display module and shows a cross-sectional configuration of the display module 200 taken along line A-A of FIG. 1.

Referring to FIG. 2, the display module 200 includes a display panel 210 where an image is displayed, a backlight unit 100 providing light to the display panel 210, a bottom cover 110 forming a lower appearance of the display module 200, a panel supporter 240 supporting the display panel 210 at a lower side, and a top cover 230 forming a periphery of the display module 200 while supporting the display panel 210 at an upper side.

The bottom cover 110 may have a box shape of which a top surface is opened to receive the backlight unit 100.

In addition, one side of the bottom cover 110 may be fixed to one side of the top cover 230. For example, a fastening member such as a screw penetrates the side of the display module 200, that is, a portion where the bottom cover 110 and the top cover 230 are superimposed on each other so as to fix the bottom cover 110 and the top cover 230.

Although the display panel 210 is not shown in detail, for example, the display panel 210 may include a lower substrate 211 and an upper substrate 212 that are attached to each other to maintain a uniform cell gap with facing each other and a liquid crystal layer interposed between the two substrates. A plurality of gate lines and a plurality of data lines crossing the plurality of gate lines are formed on the lower substrate 211 and a thin film transistor (TFT) may be formed at an intersection region of the gate line and the data line.

Meanwhile, although color filters may be formed on the upper substrate 212, the structure of the display panel 210 is not limited thereto and the display panel 210 may have various structures. For example, the lower substrate 211 may include the color filter in addition to the thin film transistor. Further, the display panel 210 may have various structures in accordance with a scheme driving the liquid crystal layer.

Further, a gate driving printed circuit board (PCB) supplying a scan signal to the gate line and a data driving printed circuit board (PCB) supplying a data signal to the data line may be provided at the edge of the display panel 210. A polarizing film (not shown) may be disposed at any one of an upper part and a lower part of the display panel 210.

An optical sheet 220 may be disposed between the display panel 210 and the backlight unit 100. The optical sheet 220 may be removed and is not limited thereto. The optical sheet 220 may include a diffusion sheet (not shown) or a prism sheet (not shown).

The diffusion sheet may evenly diffuse light emitted from the light guide plate and the diffused light may be concentrated on the display panel by the prism sheet. Herein, the prism sheet may be selectively configured by using a horizontal or/and vertical prism sheet, illumination enhanced films of one sheet or more, etc. The type or number of the optical sheet 220 may be added or deleted within a technical scope of the embodiment and is not limited thereto.

Meanwhile, the backlight unit 100 may include a plurality of optical assemblies 10 forming a plurality of divided driving regions. In addition, the display panel 210 has a plurality of divided regions to correspond to the optical assemblies 10 and the optical assemblies 10 may control the luminance of the display panel 210 in accordance with a gray peak value or a color coordinate signal of the divided region.

A shapes or structure of the liquid crystal panel 210, the backlight unit 100, or the optical assembly 10 provided in the backlight unit 100 shown in FIG. 2 is an embodiment of the present invention and the present invention is not limited thereto.

Figure 3:
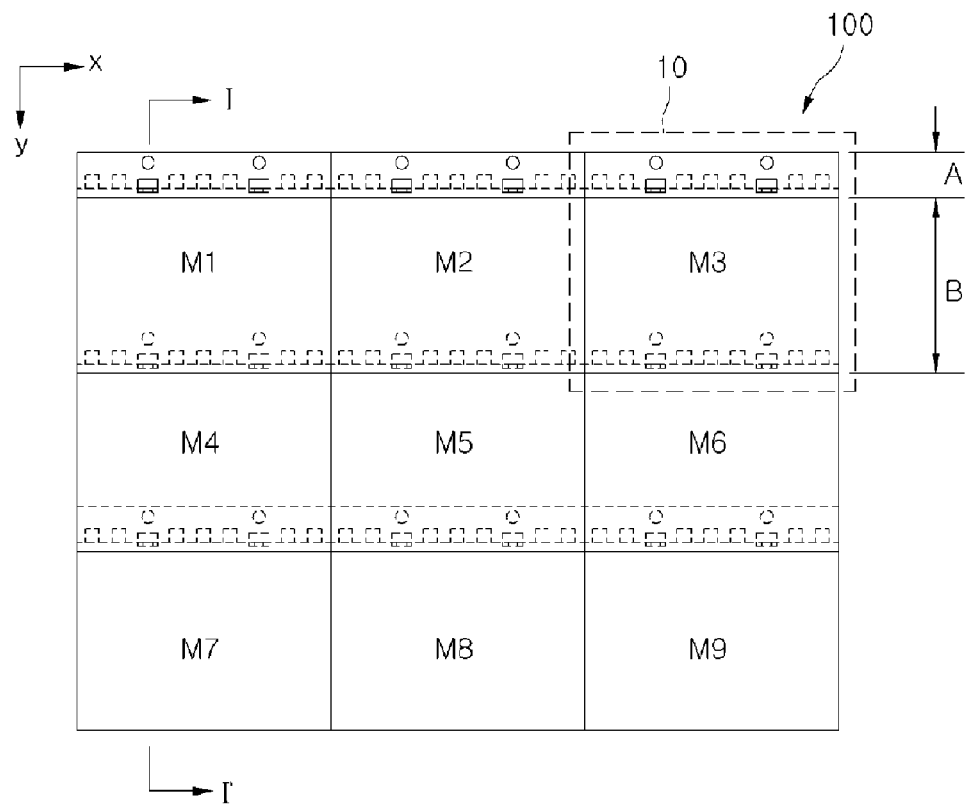
FIG. 3 is a plan view schematically showing a configuration of a backlight unit according to a first embodiment of the present invention.

FIG. 3 is a plan view showing a first embodiment of a configuration of a backlight unit 100 and schematically shows the configuration of the backlight unit 100 viewed from the front.

Referring to FIG. 3, the plurality of optical assemblies 10 provided in the backlight unit 100 may be disposed in a matrix type of N number and M number (N, M is a natural number of 1 or more) in an x-axis direction and a y-axis direction, respectively.

According to the embodiment of the present invention, the optical assemblies 10 may be superimposed on each other at their predetermined portions. That is, the optical assembly 10 may define a first region A and a second region B on a plane. The first region A may include a light source 13, a first part 15b and a side cover 20 and the second region B may radiate light provided at the first region to the front. The first region A may be disposed below the second region B of the optical assembly 10 disposed in the vicinity of the first region A.

The plurality of optical assemblies 10 may be disposed so that the first regions A are not observed on a plane by being superimposed on each other. However, the first regions A of the optical assemblies 10 disposed at one edge of the backlight unit 100 may be shown on a plane without being superimposed to each other. The second regions B may be disposed close to each other while front/back boundaries and left/right boundaries are closely attached to each other.

Each optical assembly 10 is driven in an edge-type backlight scheme. Each optical assembly 10 operates as one light source again and the plurality of optical assemblies 10 are thus disposed in a direct type backlight scheme to form the backlight unit. Accordingly, a problem that light emitting diodes are observed as a hot spot on a screen can be solved, and in addition, the thickness of the light guide plate is reduced and the number the optical films is decreased to thereby slimming of the backlight unit.

For example, in the backlight unit 100 of FIG. 1, 9 optical assemblies M1 to M9 may be disposed in 3×3 matrix.

Each of the optical assemblies 10 may be fabricated as an independent assembly and the optical assemblies 10 are adjacent to each other to form a module-type backlight unit. The module-type backlight unit as a backlight means may provide light to the display panel.

The backlight unit 100 according to the embodiment may be driven by a full driving scheme or a partial driving scheme such as local dimming, impulsive, etc. The driving scheme of the light emitting diode 11 may be variously changed depending on circuit design and is not limited. As a result, in the embodiment, a color contrast ratio is increased and images for a bright part and a dark part on a screen can be clearly expressed, such that an image quality is improved.

That is, the backlight unit 100 is divided into a plurality of blocks to be driven for each of the divided blocks, and decreases the luminance of a black part of an image and increases the luminance of a bright part by linking the luminance of each of the divided blocks with the luminance of an image signal so as to improve a contrast ratio and definition.

For example, in the case in which the backlight unit 100 is driven in the local dimming scheme, the display panel 210 may have a plurality of division regions to correspond to the blocks of the backlight unit 100, respectively. The brightness of the light emitted from each of the blocks of the backlight unit 100 may be controlled depending on a luminance level of each of the division regions of the display panel 210, i.e., a peak value of a gray level or a color coordinate signal. More specifically, some optical assemblies of the plurality of optical assemblies included in the backlight unit 100, i.e., only an optical assembly M5 is independently driven to emit light.

The backlight unit 100 according to the embodiment adopts the partial driving scheme to reduce power consumption and thus save a cost.

Further, the backlight unit 100 according to the embodiment can improve productivity because a process of manufacturing the backlight unit 100 by assembling the optical assemblies 10 is simple and a loss that may be generated during the assembling is minimized. Further, failures by a scratch of a light guide plate, etc., which may occur during the assembling of the backlight unit 100 can be reduced and occurrence of optical mura can be improved so as to improve process reliability and improve a quality.

The backlight unit 100 is advantageous in that the optical assembly 10 is standardized and mass-produced to be applied to backlight units having various sizes.

Meanwhile, in the case in which any one of the optical assemblies 10 of the backlight unit 100 has a failure, only the optical assembly having the failure has to be replaced without replacing the entire backlight unit 100. Therefore, a replacing work is easy and a part replacement cost is saved.

The optical assembly 10 and the backlight unit 100 having the same according to the embodiment are resistant to an impact from the outside or an environmental change and have excellent durability.

Since among the optical assemblies 10 of the backlight unit 100 according to the embodiment, some of neighboring optical assemblies 10 are superimposed on each other, generation of a bright line or a dark line can be improved on a boundary of the optical assemblies 10 and the uniformity of light can be ensured.

The backlight unit 100 according to the embodiment can be easily applied to a large-sized display panel. Further, the embodiment is advantageous in slimming the backlight unit and a display module.

In FIG. 3, the embodiment of the present invention is described by exemplifying the case in which the light source and the light guide plate constitute one optical assembly 10 and the plurality of optical assemblies 10 constitute the backlight unit 100, but the present invention is not limited thereto.

According to the embodiment of the present invention, the backlight unit 100 is constitute by the plurality of optical assemblies 10 and each of the optical assemblies 10 may be driven by being divided into two or more blocks.

That is, the plurality of light sources included in one optical assembly 10 may be divided into the plurality of blocks and may be driven for each of the divided blocks. For example, a plurality of light sources included in an optical assembly 10 M3 may be divided into the plurality of blocks and may be driven for each of the divided blocks.

The block is a basic unit to which driving power which allows the backlight unit 100, more specifically, the light sources provided in the backlight unit 100 to emit the light is supplied. That is, the light sources included in one block are turned on or turned off at the same time and when the light sources are turned on, the light sources may emit light having the same luminance. Further, light sources included in different blocks in the backlight unit 100 may emit light having different luminance by being supplied with different driving powers.

Figure 4:
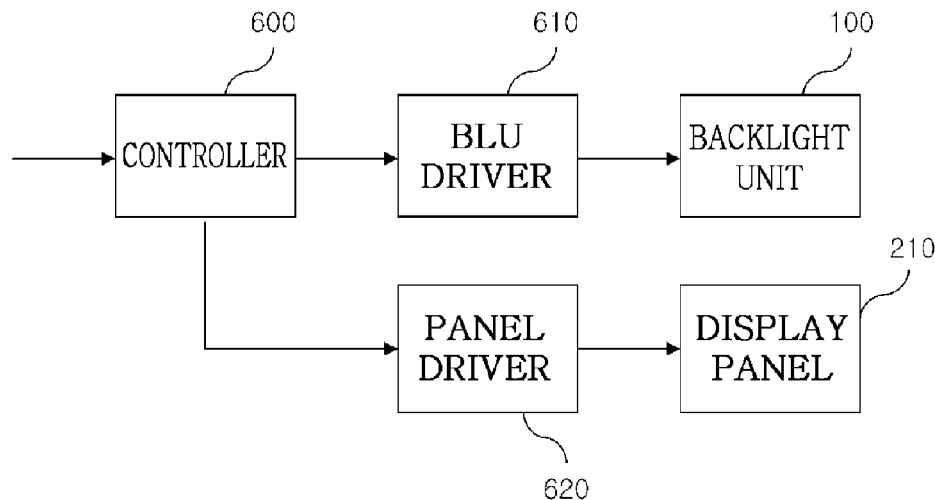
FIG. 4 is a block diagram schematically showing a configuration of a display device according to a first embodiment of the present invention.

FIG. 4 is a block diagram showing a configuration of a display device according to a first embodiment of the present invention. The shown display device may include a controller 600, a BLU driver 610, a panel driver 620, a backlight unit 100, and a display panel 210. Meanwhile, the same components among the components of the display device shown in FIG. 4 as the components described by referring to FIGS. 1 to 3 will not be described below.

Referring to FIG. 4, an image may be displayed in 60, 120, or 240 frames per second in the display panel 210 and as the number of frames per second is increased, a scan period T of the frame is shortened.

The panel driver 620 receives various control signals and image signals from the controller 600 to generate a driving signal for driving the display panel 210 and supply the driving signal to the display panel 210. For example, the panel driver 620 may include a gate driving unit (not shown) connected with a gate line of the display panel 210, a data driving unit (not shown), and a timing controller (not shown) controlling them.

Meanwhile, the controller 600 may output a local dimming value depending on the image signal to the BLU driver 610 so as to control the luminance of the backlight unit 100, more specifically, the luminance of the light sources included in the backlight unit 100 in response to the image signal.

Further, the controller 600 may provide information on a scan period T at which one frame is displayed in the display panel 210, i.e., a vertical synchronization signal Vsync to the BLU driver 610.

The BLU driver 610 may control light to be emitted from the light sources in synchronization with the display of the image in the display panel 210 by driving the light sources included in the backlight unit 100 in accordance with the inputted scan period T.

Meanwhile, each of the light sources included in the backlight unit 100 may include a plurality of point light sources, i.e., light emitting diodes (LEDs). The plurality of point light sources included in one block may be turned on or turned off at the same time.

Meanwhile, according to the embodiment of the present invention, by the division driving scheme such as the local dimming, etc., the plurality of light sources provided in the backlight unit 100 are divided into the plurality of blocks and the luminance of light sources included in each of the blocks may be controlled in accordance with luminance levels of regions of the display panels 210 corresponding to the divided blocks, respectively, i.e., gray level peak values or color coordinate signals.

For example, in the case in which an image is displayed at a first region of the display panel 210 and no image is displayed, that is, a black is displayed at a second region of the display panel 210, the BLU driver 610 may control the backlight unit 100, more specifically, the light sources included in the backlight unit 100 so that light sources included in a block corresponding to the second region among the divided blocks emit light of luminance lower than light sources included in a block corresponding to the first region.

Meanwhile, the light sources included in the block of the backlight unit 100 corresponding to the second region where an image is not displayed but the black is displayed in a display screen of the display panel 210 may be turned off, thereby further reducing the power consumption of the display device.

That is, the controller 600 generates a local dimming value corresponding to the brightness of each of the blocks of the backlight unit 100 in accordance with a luminance level of an inputted image signal, i.e., a luminance level of an entire image or a luminance level of a predetermined region, that is, a local block dimming value for each block and outputs the generated local block dimming value to the BLU driver 610. The BLU driver 610 may control the brightness of each of the blocks of the backlight unit 100 by using the inputted local dimming value for each block.

Hereinafter, a method of driving a display device according to an embodiment of the present invention will be described in more detail with reference to FIGS. 5 to 10.

Figure 5:
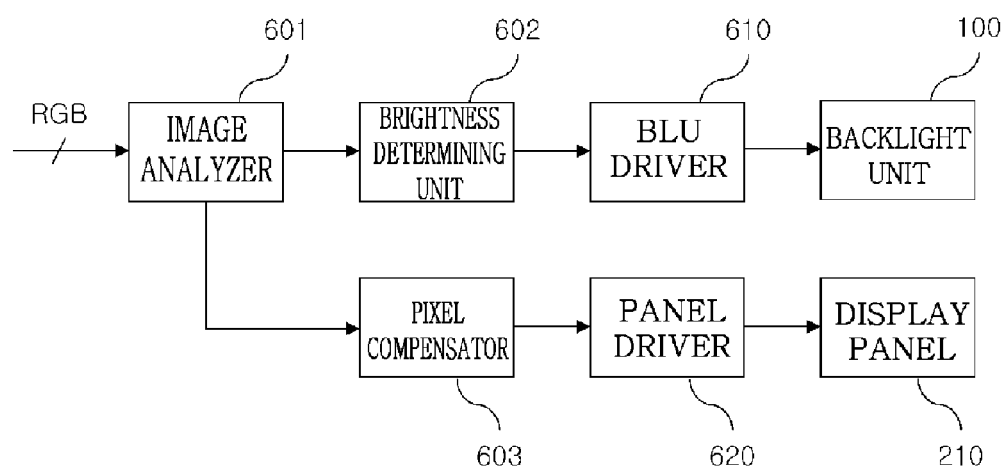
FIG. 5 is a block diagram showing a configuration of a display device according to a second embodiment of the present invention.

FIG. 5 is a block diagram showing a configuration of a display device according to a second embodiment of the present invention. The same components among the components of the display device shown in FIG. 5 as the components described by referring to FIGS. 1 to 4 will not be described below.

Referring to FIG. 5, the display device according to the embodiment of the present invention may include an image analyzing unit 601 judging a luminance level of an entire image or some regions by receiving an RGB image signal, a brightness determining unit 602 determining the brightness of a light source, i.e., an LED, which corresponds to the luminance level judged by the image analyzing unit 601, and a BLU driver 610 driving the backlight unit 100 depending on the brightness level determined by the brightness determining unit 602.

Further, the display device may include a pixel compensator 603 changing a luminance level of the RGB image signal by reflecting the luminance level of the image analyzed by the image analyzing unit 601 and a panel driver 620 outputting a driving signal to the display panel 210 so as to output an image depending on the R' G'B' signal compensated by the pixel compensator 603.

The image analyzing unit 601 divides an image region of the inputted RGB image signal into plural regions and provides information on the luminance level of the image to the brightness determining unit 602 so as to judge the brightness of the light sources included in the blocks of the backlight unit 100, which correspond to the divided regions.

For example, the information on the luminance level of the image provided to the brightness determining unit 602 from the image analyzing unit 601 may include an average block level (ABL) of a region corresponding to a block of which the brightness will be determined and an average picture level (APL) of another region adjacent thereto or an entire region of an image.

That is, the image analyzing unit 601 may divide an image of one frame into plural regions and provide information on an average luminance level of divided first regions and an average luminance level of other regions adjacent to the first region to the brightness determining unit 602. Further, the image analyzing unit 601 may provide corresponding information to the brightness determining unit 602 for the brightness determining unit 602 to use the information on the average picture level of the entire image when the brightness determining unit 602 wants to determine the brightness of a predetermined block of the backlight unit 100.

According to an embodiment of the present invention, a look-up table for determining the brightness of the predetermined block of the backlight unit 100 depending on the measured average picture level of the entire image or some regions needs to be provided, and the brightness determining unit 602 may read the brightness of the light source corresponding to the average picture level measured by the image analyzing unit 601 from the look-up table and output it.

Figure 6:
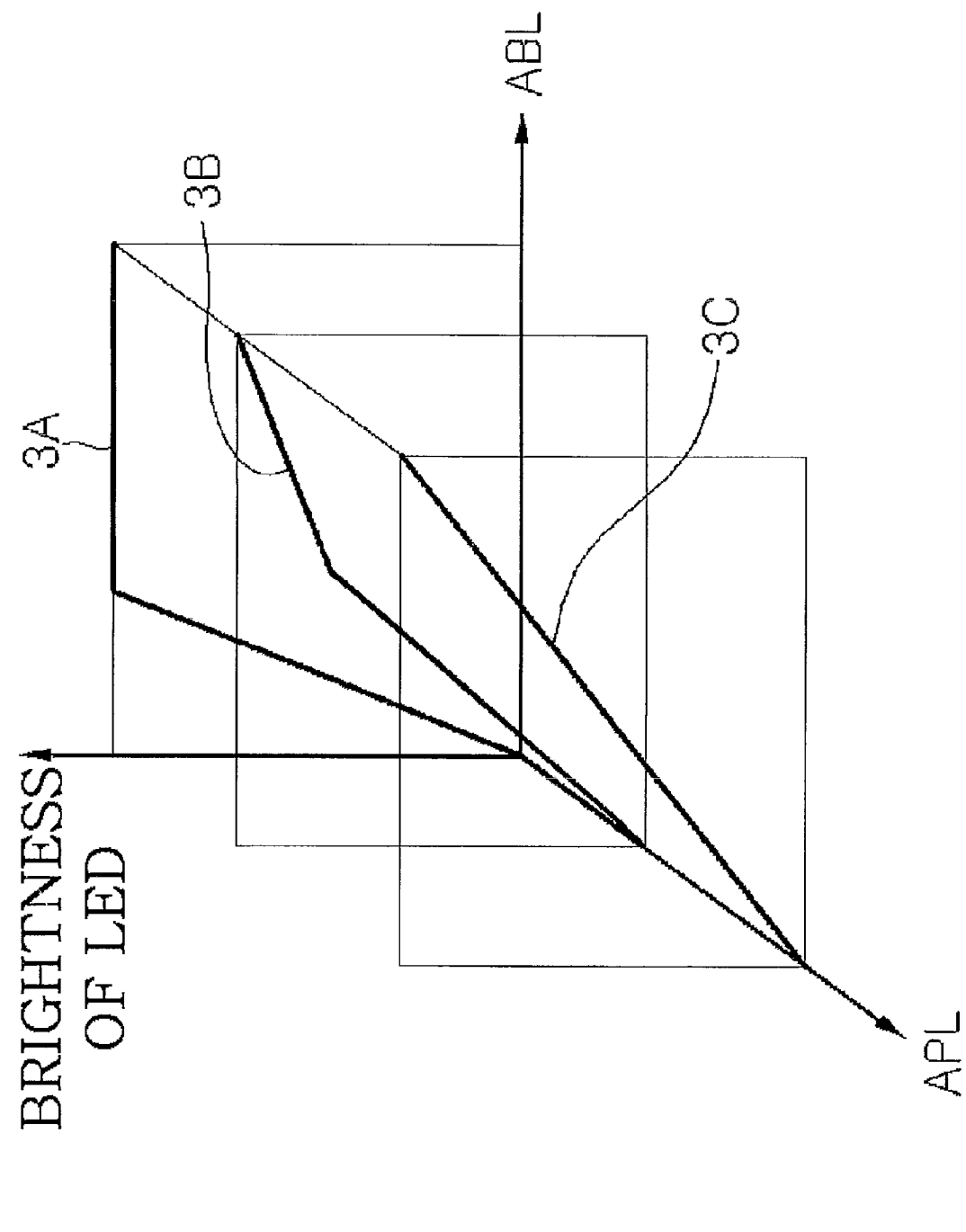
FIG. 6 is a graph showing a first embodiment of a method of determining the brightness of a light source depending on an average picture level of an image.

FIG. 6 is a graph showing a first embodiment of a method of determining the brightness of a light source depending on an average picture level of an image. Herein, an x axis represents the average block level (ABL) of divided regions of the display panel 210, a y axis represents the brightness of blocks of the backlight unit 100 corresponding to the divided regions, and a z axis represents the average picture level (APL) of the entire region.

Referring to FIG. 6, if the average picture level of the entire image is less than an 'A' value, the brightness of the corresponding block of the backlight unit 100 may be determined in accordance with a first graph 3A, if the average picture level of the entire image is equal to or more than the 'A' value or less than a 'B' value, the brightness of the block of the backlight unit 100 may be determined in accordance with a second graph 3B, and if the average picture level of the entire image is equal to or more than the 'B' value, the brightness of the block of the backlight unit 100 may be determined in accordance with a third graph 3C.

For example, if the average picture level of the entire image is equal to or more than the predetermined 'B' value, the entire image should be expressed in bright gray-scale. Therefore, the brightness of the corresponding block of the backlight unit 100 may be determined using the third graph 3C. In this case, since an image to be displayed on the display panel 210 is bright on the whole, a phenomenon in which a screen becomes dark is not really a problem while maximizing a local dimming effect of the backlight unit 100.

In other words, in the case in which an image should be expressed in bright gray-scale on the whole, as the average block level measured for each of the divided regions of the image is larger, the brightness of the corresponding block may be determined as a higher value and as the average block level of each of the divided regions is smaller, the brightness of the corresponding block may be determined as a lower value. For reference, a graph of LED brightness for the average block level of each divided region is shown as a graph having a single slope in the figure.

Meanwhile, in the case in which the image is expressed in a dark gray-scale on the whole, that is, in the case in which the average picture level of the entire image is less than an 'A' value, local dimming may be performed only for a divided region having an average block level smaller than a predetermined luminance value.

That is, in a proposed look-up table, local dimming in which the brightness of the light source is changed may be performed only for the divided region having the average block level smaller than the predetermined luminance value. The reason is why when the brightness of the light source is determined in accordance with a local dimming graph such as the third graph 3C in the case in which the image is dark on the whole, the brightness of the image is too dark, such that color reproducibility rather deteriorates.

Therefore, in the case in which the luminance level of the entire image is low, the local dimming is not performed for divided regions having an average block level of predetermined brightness or more.

In addition, in the case in which the average picture level of the entire image is positioned between the 'A' value and the 'B' value, when the measured average block level of the divided region is larger than a predetermined level, the change of the brightness of the light source is small and when the average block level of the divided region is smaller than the predetermined value, the change of the brightness of the light source is large. That is, a local dimming value corresponding to the light source may be small for divided regions having a bright gray-scale and the local dimming value corresponding to the light source may be comparatively larger for divided regions having the lower gray-scale.

A graph showing the brightness of the light source for each average picture level in accordance with the look-up table is stored for a case in which the average picture level of the entire image is the maximum (MAX) and a case in which the average picture level of the entire image is the minimum (MIN) and a table corresponding to the measured average picture level of the entire image can be determined between maximum and minimum graphs of the average picture level of the entire image.

Figure 7:
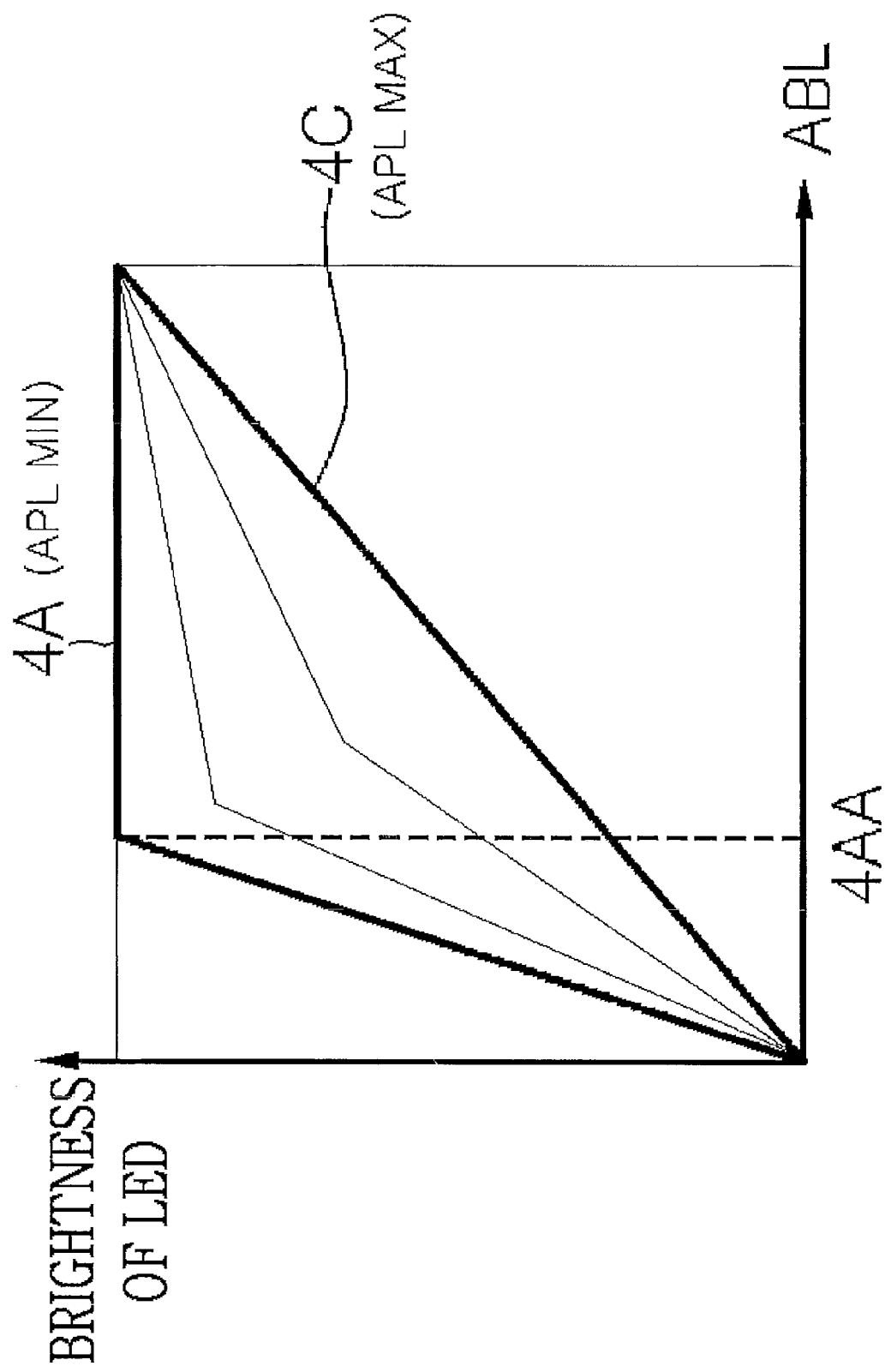
FIG. 7 is a graph showing a second embodiment of a method of determining the brightness of a light source depending on an average picture level of an image.

Referring to FIG. 7, a graph 4C adopted in the case in which the average picture level (APL) of the entire image is the maximum (MAX) and a graph 4A adopted in the case in which the APL is the minimum (MIN) are exemplified. That is, in the case in which the average picture level of the entire image is the maximum, the brightness of the image is the maximum. Therefore, even though the local dimming is performed for each divided region, the color reproducibility does not deteriorate and power consumption caused by driving the backlight unit 100 can be considerably saved.

In addition, in the case in which the average picture level of the entire image is the minimum, the brightness of the image is the minimum. Therefore, in this case, when the local dimming is performed for the entire image, the color reproducibility of the image rather deteriorates. As a result, in this case, by performing the local dimming for the corresponding divided region in the case in which the average block level of the divided regions is smaller than a predetermined value 4 AA, it is possible to save the power consumption caused by the driving of the backlight unit 100 without remarkably deteriorating the color reproducibility.

In addition, in the case in which the average picture level of the entire image is not the maximum or the minimum, a look-up table (graph) to be adopted may be generated by interpolating the graphs 4A and 4C. That is, the brightness determining unit 602 may generate a new graph positioned in a region formed by the graphs 4A and 4C by using the look-up tables when the average picture level of the entire image is the maximum and the minimum.

According to another embodiment of the present invention, an image signal provided to the display panel 210, i.e., the RGB signal may be compensated.

That is, in the case in which the local dimming for the backlight unit 100 is performed as described above, regions (alternately, pixels) where colors will be expressed may be present in each the divided regions of the display panel 210. In this case, by applying a gain generated depending on the luminance level of the entire image to the RGB signal provided to the panel driver 620, it is possible to prevent the color from being incompletely reproduced by the local dimming.

For example, in the case in which the local dimming is performed for a predetermined region within the image, the average block level of the corresponding divided region is low, such that characters or images to be expressed in the divided region may be present even though the degree of the local dimming is large. That is, in the case in which the entire APL is low, the degree of the local dimming is large, such that the entire image is expressed dark. Therefore, even the characters or images to be expressed may be expressed dark.

In this case, by improving the luminance level of the RGB signal provided to the display panel 210 while maintaining the reduction of the power consumption by the local dimming as it is, it is possible to achieve color reproduction of the characters or images.

The pixel compensator 603 may compensate the image signal by multiplying the luminance level of the inputted RGB signal by a compensation value $\alpha$. For example, the pixel compensator 603 may calculate the compensation value $\alpha$ by using the average picture level of the entire image measured by the image analyzing unit 601.

Figure 8:
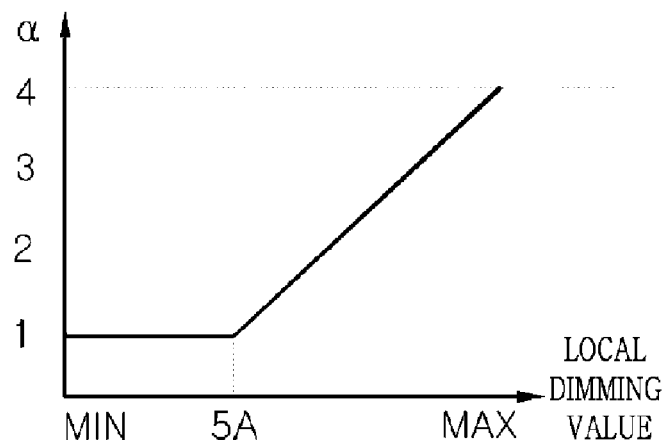
FIG. 8 is a graph showing an embodiment of a method of determining a compensation value of an image signal depending on an average luminance level of an image.

FIG. 8 is a graph showing an embodiment of a method of determining a compensation value $\alpha$ of an image signal depending on an average picture level of an image.

Referring to FIG. 8, in the case in which the screen is dark, comparatively large compensation may be performed and in the case in which the screen is bright, a saturation frequency of an RGB value can be reduced by decreasing the compensation value $\alpha$ to thereby achieve more natural pixel compensation.

An x axis of the graph shown in FIG. 8 represents the average picture level of the entire image measured by the image analyzing unit 601 and a y axis represents a compensation value $\alpha$ for compensating the pixel of the RGB signal, which corresponds to the average picture level.

That is, in the case in which the local dimming is not adopted or the local dimming value is equal to or less than a predetermined reference value, i.e., 5A, the compensation value for compensating the pixel is set to 1 and as the local dimming value is close to the maximum value (MAX), the compensation value $\alpha$ may increase to 1 or more. Accordingly, it is possible to compensate the pixel as much as an actually expressed image of the characters or images is dark by the local dimming.

Meanwhile, the compensated characters or images may represent a region where the gain of the RGB image signal is equal to or more than a predetermined value.

According to another embodiment of the present invention, the controller 600 may further include a filtering unit (not shown) correcting the brightness level determined by the brightness determining unit 602 in order to prevent the brightness of the light source, i.e., the LED from being rapidly changed in time.

Figure 9:
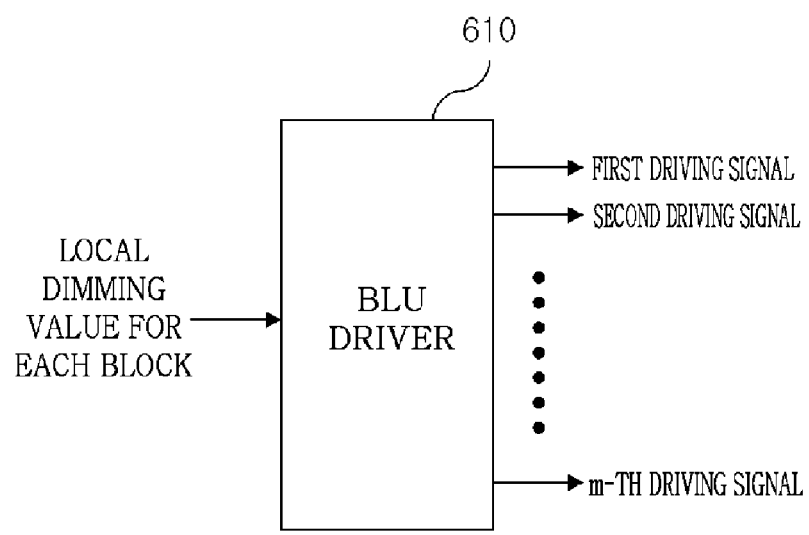
FIG. 9 is a block diagram schematically showing a configuration of a BLU driver.

FIG. 9 shows a configuration of a BLU driver provided in a display device. The same operations as the operations described with reference to FIGS. 3 to 8 among the operations of the BLU driver 610 shown in the figure will not be described below.

Referring to FIG. 9, the BLU driver 610 may receive a local dimming value for each block representing the brightness of each of the divided blocks of the backlight unit 100 from the controller 600, more specifically, the brightness determining unit 602 provided in the controller 600 and output a plurality of driving signals, i.e., first to m-th driving signals by using the received local dimming value for each block.

Meanwhile, each of the plurality of driving signals outputted from the BLU driver 610 may control the brightness of two or more blocks among the divided blocks of the backlight unit 100.

That is, the BLU driver 610 may generate a first driving signal for controlling the brightness of n blocks, i.e., first to n-th blocks among the blocks of the backlight unit 100 and provide the first driving signal to light sources belonging to the first to n-th blocks. For this, the BLU driver 610 may generate the first driving signal by using local dimming values corresponding to the first to n-th blocks among the local dimming values for each block, which are inputted from the controller 600.

According to the embodiment of the present invention, the controller 600 and the BLU driver 610 may transmit and receive a signal by using a serial peripheral interface (SPI) communication, that is, the BLU driver 610 may receive the local dimming value for each block from the controller 600 by using the SPI communication.

Figure 10:
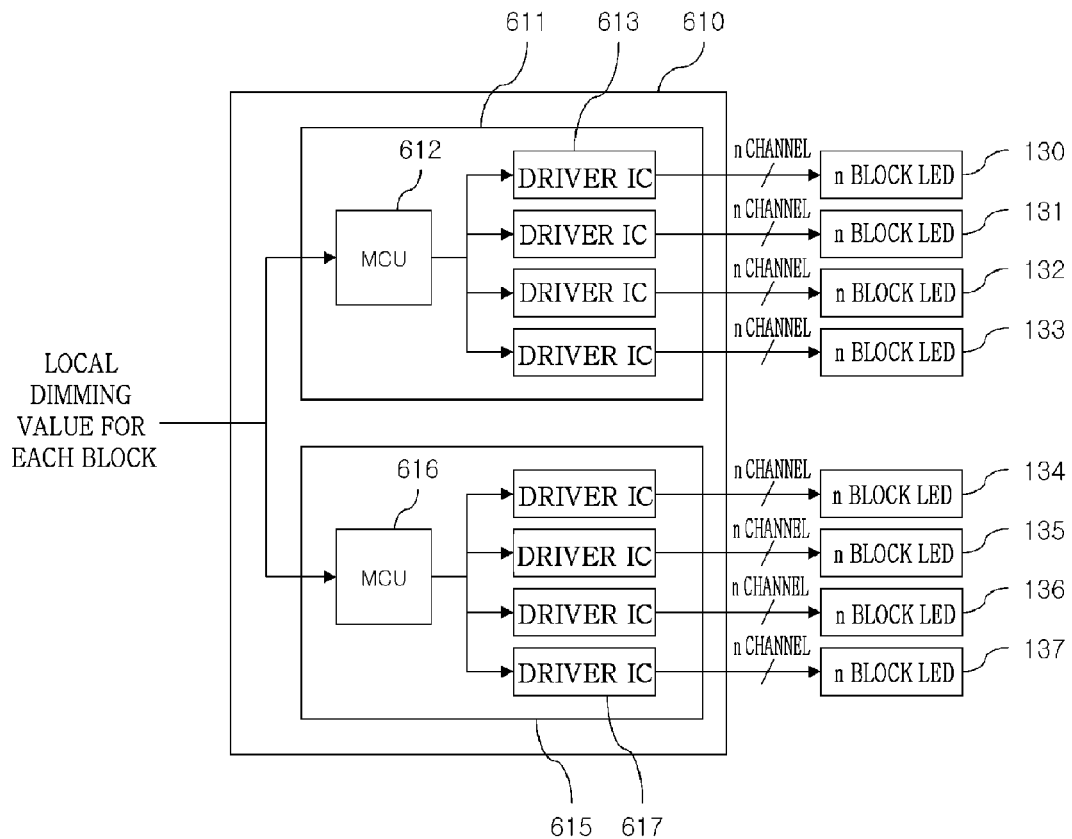
FIG. 10 is a block diagram showing an embodiment of a configuration of a BLU driver.

Referring to FIG. 10, the BLU driver 610 may include a plurality of driving units 611 and 615 and each of the driving units 611 and 615 may include MCUs 612 and 616 and a plurality of driver ICs 613 and 617.

For example, the first driving unit 611 includes the MCU 612 and the plurality of driver ICs 613. The MCU 612 receives the local dimming values for each block from the controller 600, more specifically, the brightness determining unit 602 provided in the controller 600 in series and outputs the received local dimming values in parallel to transmit local dimming values of blocks corresponding to the plurality of driver ICs 613, respectively.

Meanwhile, each of the plurality of driver ICs 613 may control the brightness of n blocks among the divided blocks of the backlight unit 100. For this, the driver ICs 617 may output the driving signal for controlling the brightness of the n blocks by using n channels.

For example, the first driving unit 611 may include 4 driver ICs 613 and each of 4 driver ICs 613 outputs a driving signal by using 16 channels to control the brightness of light sources belonging to 16 blocks. As a result, the first driving unit 611 may control the brightness of 4×16, that is, 64 blocks among the divided blocks of the backlight unit 100.

Further, the second driving unit 615 includes the MCU 616 and the plurality of driver ICs 617. The MCU 616 receives the local dimming values for each block from the controller 600, more specifically, the brightness determining unit 602 provided in the controller 600 in series and outputs the received local dimming values in parallel to transmit local dimming values of blocks corresponding to the plurality of driver ICs 617, respectively.

Meanwhile, each of the plurality of driver ICs 617 may control the brightness of n blocks among the divided blocks of the backlight unit 100. For this, the driver ICs 617 may output the driving signal for controlling the brightness of the n blocks by using n channels.

The configuration of the BLU driver 610 shown in FIG. 10 is just an embodiment of the present invention. Therefore, the display device according to the present invention is not limited to the configuration shown in FIG. 10. That is, the BLU driver 610 may include three or more driving units. The number of the blocks of the backlight unit 100 of which the brightness is controlled by each of the driving units is variable.

According to the embodiment of the present invention, the backlight unit 100 is divided into a plurality of scan groups and may be sequentially driven in the group unit. For this, the BLU driver 610 may control the divided blocks of the backlight unit 100 to be sequentially driven in the unit of one or more group unit at the time of driving the backlight unit 100, more specifically, the light sources provided in the backlight unit 100 by receiving the local dimming value for each block from the controller 600.

Accordingly, when a viewer sees a predetermined object move in a moving picture, a phenomenon in which an image is blurred while viewer's eyes are following the moving object, that is, a motion blur phenomenon may be reduced.

Figure 11:
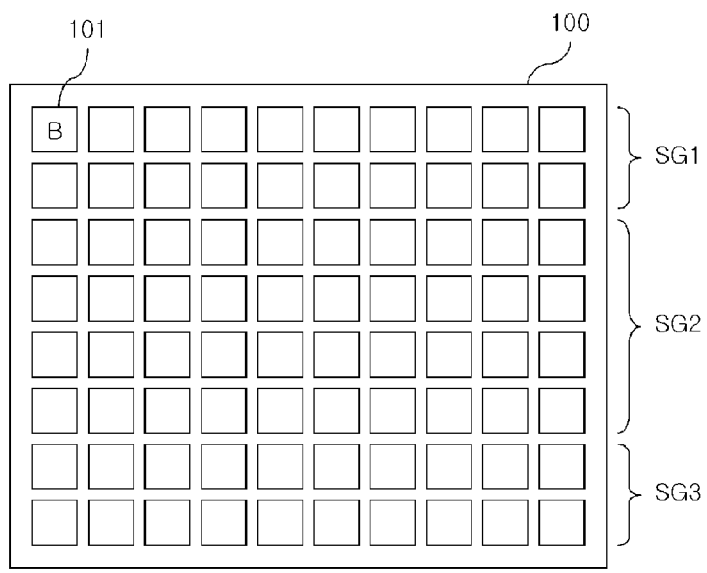
FIG. 11 is a plan view schematically showing a configuration of a backlight unit according to a second embodiment of the present invention.

FIG. 11 is a plan view showing a configuration of a backlight unit according to a second embodiment of the present invention. The same components of the backlight unit 100 shown in FIG. 11 as those explained by referring to FIGS. 1 to 10 will not be described below.

Referring to FIG. 11, the backlight unit 100 is divided into a plurality of blocks 101 and may be driven for each of the divided blocks. The plurality of divided blocks 101 may be divided into a plurality of scan groups SG1, SG2, and SG3 including one or more blocks. Further, the plurality of scan groups SG1, SG2, and SG3 may be sequentially driven.

Meanwhile, the scan groups may include one or more local dimming blocks. For example, the first scan group SG1 may include a plurality of local dimming blocks.

The BLU driver 610 receives local dimming values of blocks belonging to the scan group and information on a time when the scan group is scanned for each of the scan groups SG1, SG2, and SG3 from the controller 600. The scan groups SG1, SG2, and SG3 may be sequentially driven by a predetermined time interval depending on the inputted local dimming value.

Since the configuration of the backlight unit 100 shown in FIG. 11 is just an embodiment of the present invention, the present invention is not limited thereto. That is, the number of scan groups sequentially driven in the backlight unit 100 may be equal to or more than 4. As shown in FIG. 11, the number of blocks belonging to at least two scan groups, i.e., the first scan group SG1 and the number of blocks belonging to the second scan group SG2 are different from each other or the numbers of blocks belonging to all the scan groups may be the same as each other.

Further, the scan group may be constituted by not radial-type blocks but various types of blocks. For example, the scan group may be constituted by even '⊓' -shape blocks or '⊔' -shape blocks. Further, since each scan group may be constituted by a plurality of local dimming blocks, a local dimming control may be available for each scan group.

Figure 12:
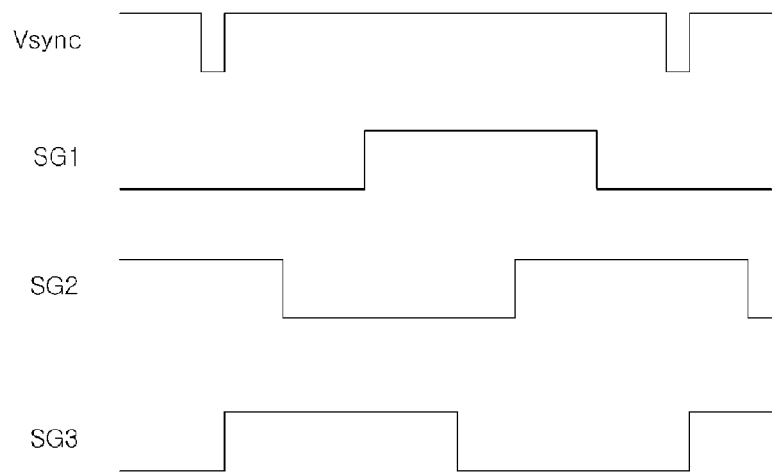
FIGS. 12 to 14 are timing diagrams showing embodiments of a method of scan-driving blocks of a backlight unit in the group unit.

Referring to FIG. 12, during a period between two vertical synchronization signals Vsync, that is, a period corresponding to one frame, the plurality of scan groups SG1, SG2, and SG3 of the backlight unit 100 may be sequentially driven.

That is, as shown in FIG. 12, light sources belonging to each of blocks of the plurality of scan groups SG1, SG2, and SG3 may be sequentially turned on.

More specifically, one or more MCUs 612 and 616 provided in the BLU driver 610 may sequentially output local dimming values inputted from the controller 600 to the plurality of connected driver ICs 613 and 617 by using information on a scan time inputted from the controller 600.

Figure 13:
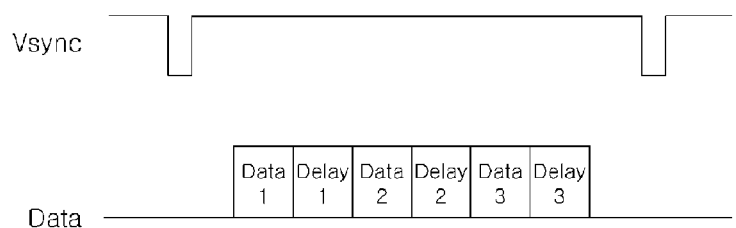
Figure 14:
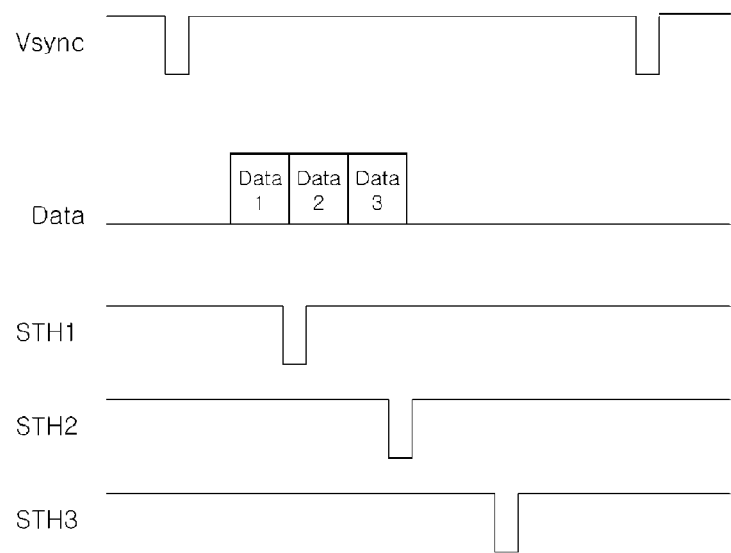

FIGS. 13 to 14 show embodiments of a method of scan-driving blocks of a backlight unit in the group unit.

Referring to FIG. 13, the BLU driver 610 may receive information on a scan period T corresponding to one frame from the controller 600. The BLU driver 610 may sequentially scan-drive the blocks of the backlight unit 100, more specifically, the light sources in the group unit during a frame period between two consecutive vertical synchronization signals Vsync in accordance with the scan period T.

For example, the controller 600 may provide a first group data signal Data 1 indicating a local dimming value corresponding to the brightness of each of the light sources included in the blocks of the first scan group SG1 and a first group control signal delay 1 indicating a delay time up to a time when the light sources of the first scan group SG1 are scanned in accordance with the data signal Data 1 to the BLU driver 610.

Thereafter, the controller 600 may provide a second group data signal Data 2 indicating a local dimming value corresponding to the brightness of each of the light sources included in the blocks of the second scan group SG2 and a second group control signal delay 2 indicating a delay time up to a time when the light sources of the second scan group SG2 are scanned in accordance with the data signal Data 2 to the BLU driver 610.

Lastly, the controller 600 may provide a third group data signal Data 3 indicating a local dimming value corresponding to the brightness of each of the light sources included in the blocks of the third scan group SG3 and a third group control signal delay 3 indicating a delay time up to a time when the light sources of the third scan group SG3 are scanned in accordance with the data signal Data 3 to the BLU driver 610.

As shown in FIG. 13, as the controller 600 sequentially supplies the data signals data 1, 2, and 3 and the group control signals delay 1, 2, and 3 to the plurality of scan groups, i.e., the first to third scan groups SG1, SG2, and SG3, respectively, the plurality of blocks included in the backlight unit 100, more specifically, the light source may be scan-driven in the group unit.

Referring to FIG. 14, the controller 600 may supply a scan start signal STH 1, 2, 3 indicating a time when the light sources of the corresponding group for each scan group are scanned to each of the scan groups of the backlight unit 100.

That is, the controller 600 may sequentially supply the first group data signal Data 1 indicating the brightness of the light sources belonging to the first scan group SG1, the second group data signal Data 2 indicating the brightness of the light sources of the second group SG2, and the third group data signal Data 3 indicating the brightness of the light sources of the third scan group SG3 through data line data.

Further, the controller 600 may supply the first group scan start signal STH 1 to the BLU driver 610 in synchronization with a scan start time of the first scan group SG1, the second group scan start signal STH 2 to the BLU driver 610 in synchronization with a scan start time of the second scan group SG2, and the third group scan start signal STH 3 to the BLU driver 610 in synchronization with a scan start time of the third scan group SG3.

For example, the controller 600 may generate the scan start signals STH 1, 2, and 3 shown in FIG. 14 by delaying the vertical synchronization signal Vsync for each scan group by a predetermined time. The time when the vertical synchronization signal Vsync is delayed for each scan group may be set depending on the scan start time of each group.

Figure 15:
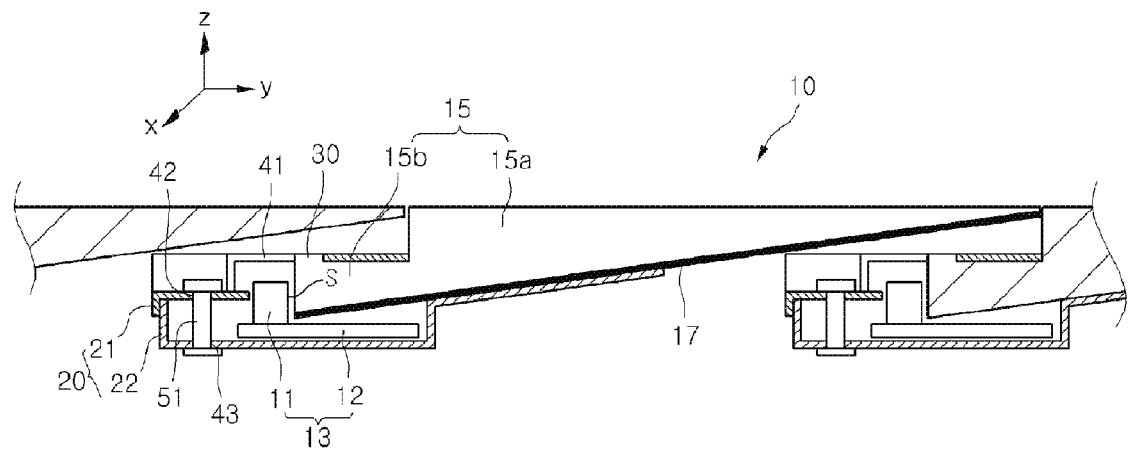
FIG. 15 is a cross-sectional view showing a cross-sectional configuration of a backlight unit according to an embodiment of the present invention.
Figure 16:
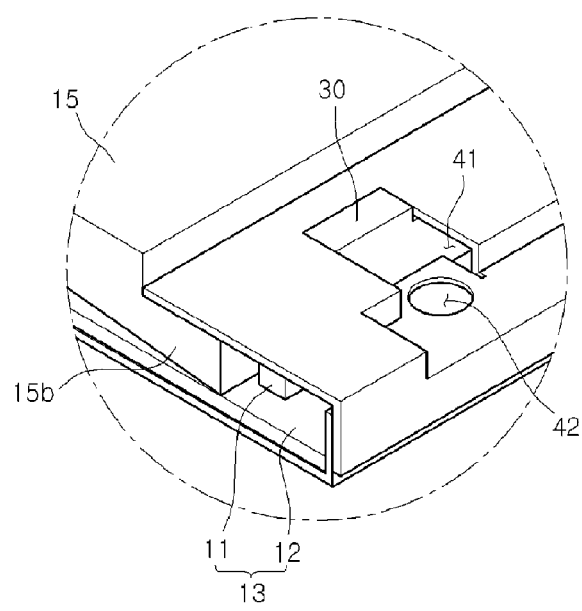
FIGS. 16 to 19 are perspective views showing components of a backlight unit shown in FIG. 15.
Figure 18:
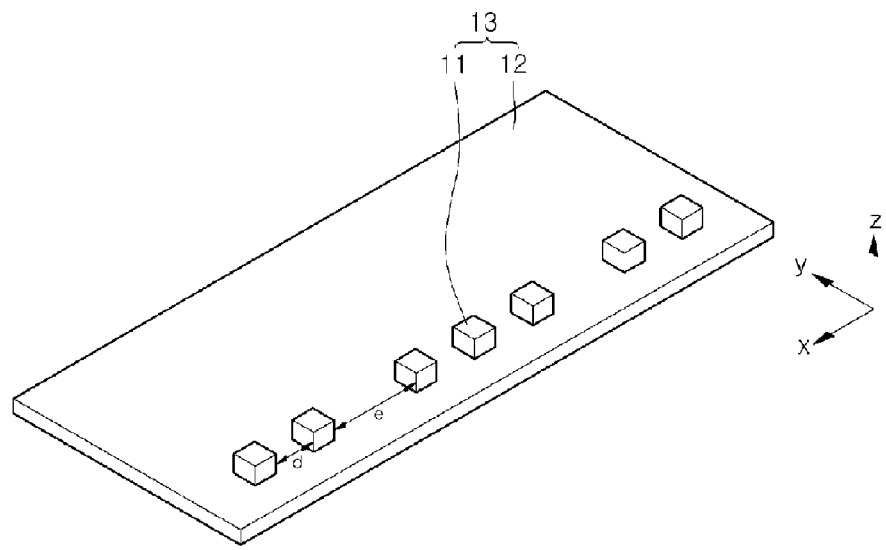
Figure 19:
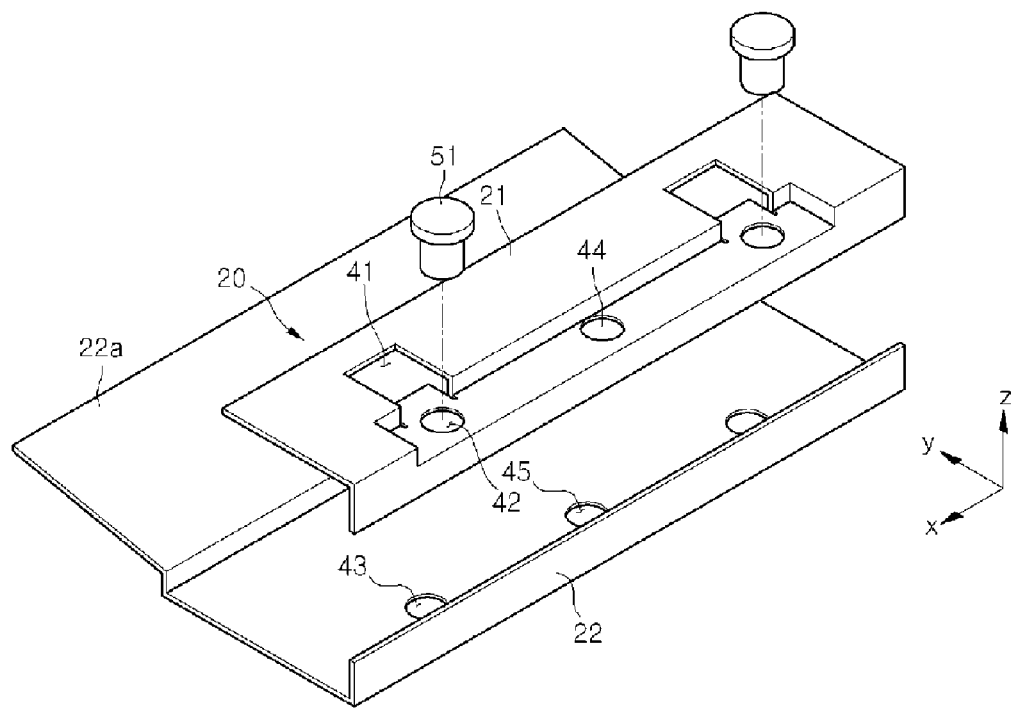

FIG. 15 is a cross-sectional view showing a configuration of a backlight unit according to an embodiment of the present invention and FIG. 16 is a perspective view of FIG. 15. In addition, FIGS. 17 to 19 are perspective views showing components of an optical assembly according to an embodiment of the present invention.

Figure 17:
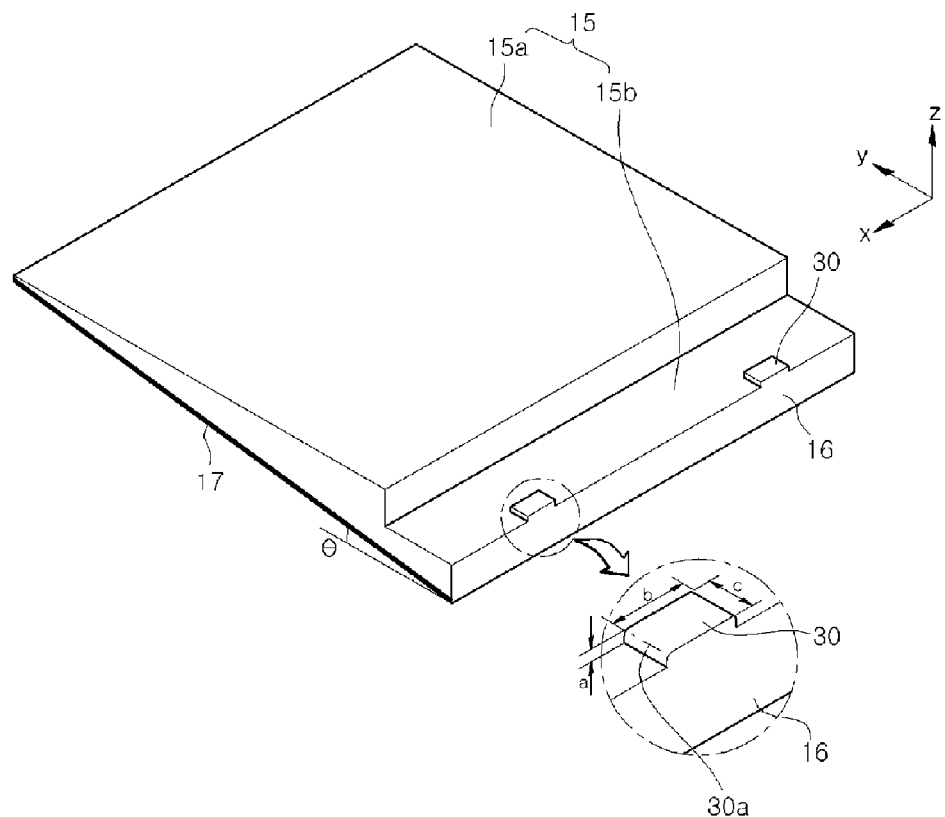

Referring to FIGS. 15 to 17, the optical assembly 10 according to the embodiment includes a light source 13, a light guide plate 15 and a reflection member 17, and a side cover 20 for fixing the light source 13 and the light guide plate 15. In addition, the side cover 20 provides a fixation location of a bottom cover 110 and includes a first side cover 21 and a second side cover 22.

The light guide plate 15 includes a first part 15b and a second part 15a. In addition, the second part 15a may be constituted by a top generating a surface light source, a bottom facing the top surface, and four sides.

The first part 15b may project in a horizontal direction on a lower portion of one side of the sides of the second part 15a. Herein, the first part 15b may be called a light input portion through which light is inputted from the light source 13 and the second part 15a may be called a light emitting portion that substantially provides light to the display panel 210 by emitting light upwards.

As shown in FIG. 15, at least a portion of the light emitting portion 15a of any one light guide plate of two light guide plates adjacent to each other may be disposed above the light input portion 15b of the other light guide plate. There are portions of two adjacent light guide plates where the light emitting portion 15a of one light guide plate overlaps with the light input portion 15b of the adjacent light guide plate, and a gap exists between the overlapped portions. Further, the gap portion is gradually reduced from one portion to the other potion.

A scattering pattern (not shown) may be formed on the top or bottom of the light guide plate 15. The scattering pattern has a predetermined pattern to serve to improve light uniformity on a full surface of the light guide plate 15 by irregularly reflecting light incident light.

As shown in FIG. 15, the bottom of the light guide plate 15 may be inclined at a predetermined angle from one portion of the second part 15a close to the first part 15b to the other end. Therefore, the thickness of the second part 15a may be gradually thinned.

The reflection member 17 may be provided on the bottom of the light guide plate 15. Light inputted through the side of the first part 15b is guided in the light guide plate 15 and reflected on the reflection member 17 and is, thereafter, outputted through the top of the reflection member. Further, the reflection member 17 may serve to prevent an interference by light generated in other optical assemblies 10 superimposed on each other.

The first part 15b may project on a lower portion of the side of the light guide plate 15 and may include a projection 30 projected from the top by a predetermined height a.

The projection 30 may be formed at least two portions in an x-axis direction on the top of the first part 15b. The projection 30 may have various shapes, i.e., a shape similar to a rectangular parallelepiped. The projection 30 is caught in the first side cover 21 to prevent the light guide plate 15 from wobbling on an x axis and a y axis.

Meanwhile, some 30a of edges of the projection 30 are rounded to prevent the projection from being cracked due to an impact applied to the projection 30 by movement of the light guide plate 15.

The projection 30 may have a height a of 0.3 to 0.6 mm from the top of the first part 15b and may have a width b of 2 to 5 mm on the x axis and a width c of 1 to 3 mm on the y axis.

Further, the projection 30 may be disposed between light emitting diodes 11 adjacent to the projection 30 and may be formed close to the light input surface 16 on the top of the first part 15b. As a result, light generated from the light emitting diodes 11 may prevent an optical interference from being generated due to the projection 30 formed integrally with the light guide plate 15.

The positional relationship between the light emitting diodes 11 and the projection 30 formed on the top of the first part 15b of the light guide plate 15 and the size of the projection 30 are not limited to the embodiment and the light emitting diodes 11 and the projection 30 may have various positional relationships depending on optical design, components, and a product group.

The light guide plate 15 is made of a transparent material, for example, may include one of acryl resin series such as polymethyl metacrylate (PMMA), polyethylene terephthalate (PET), poly carbonate (PC), and polyethylene naphthalate (PEN) resin. The light guide plate 15 may be formed by an extrusion molding method.

Referring to FIGS. 15 and 18, the light source 13 may include at least one light emitting diode 11 and a module substrate 12 on which the light emitting diode 11 is mounted.

The light emitting diodes 11 are arranged on the module substrate 12 in the x-axis direction and may be thus disposed close to the light input surface 16 of the first part 15b.

The module substrate 12 may include a metal core PCB, an FR-4 PCB, a general PCB, a flexible substrate, etc. and may be variously modified with the technical scope of the embodiment.

A thermal pad (not shown) may be disposed below the module substrate 12. The thermal pad may be formed between the module substrate 12 and the second side cover 22.

The light emitting diode 11 can emit light at a predetermined directional angle from a predetermined direction and the predetermined direction may be a direction in which the light emitting surface (S) of The light emitting diode 11 is aligned.

The light emitting diode 11 may be a side emitting type. The light emitting diode 11 may be implemented as a colored LED emitting at least one color among colors such as red, blue, and green or a white LED. Further, the colored LED may include at least one of a red LED, a blue LED, and a green LED. The disposition and emitting light of the light emitting diode 11 may be modified within the technical scope of the embodiment.

For example, The light emitting diode 11 can emit light at about 120° directional angle from the direction in which the light emitting surface(S) is aligned.

The light emitting diode 11 according to an embodiment of the present invention can be formed of a emitting type LED package with the light emitting surface(S) at a side.

In this case, the light emitting surface (S) of the light emitting diode 11 can be formed in the direction crossing the module substrate 12.

According to an embodiment of the present invention, as shown in FIG. 11, the light emitting surface(S) of the light emitting diode 11 and the module substrate 12 may cross at a right angle.

The light emitted from the light emitting diode 11 is inputted into the side of the first part 15b. Colors of light inputted form the light emitting diodes 11 may be mixed in the light guide plate 15 including the first part 15b.

The light inputted from the light emitting diodes 11 are guided in the first part 15b and inputted into the second part 15a. The light inputted into the second part 15a is reflected by the reflection member 17 on the bottom and is outputted through the top. At this time, since the light is scattered and diffused by the scattering pattern formed on the bottom of the light guide plate 15, the light uniformity can be improved.

The light emitting diodes 11 may be arranged on the module substrate 12 at a predetermined interval. In order to minimize an optical influence by the projection 30 formed on the light guide plate 15, the light emitting diode 11 may be disposed in an oblique line direction with respect to the projection 30. As a result, the interval between the light emitting diodes 11 adjacent to the projection 30 may be wider than an interval between other light emitting diodes 11.

In order to ensure space for combining the first side cover 21 and the second side cover 22 and minimize an optical influence which may be generated due to pressing of the light guide plate 15 by combination force, an interval between some light emitting diodes 11 among the light emitting diodes 11 may be wider than an interval between other light emitting diodes 11.

For example, when a first interval d between the adjacent light emitting diodes 11 is approximately 10 mm, a second interval e between light emitting diodes 11 in the vicinity of a location where the space for the combination is provided may be approximately 13 mm.

The colors of the light generated by the light emitting diodes 11 are mixed in the light guide plate 15 including the first part 15b and may be uniformly provided to the second part 15a.

Referring to FIGS. 15 to 19, the side cover 20 is formed to cover the light source 13 and a part of the light guide plate 15. For example, the side cover 20 may include a first side cover 21 disposed on an upper portion of the light source 13 and the first part 15b and a second side cover 22 disposed on a lower portion of the first part 15b. Meanwhile, the side cover 20 may be made of plastic or a metallic material.

The first side cover 21 faces the top of the first part 15b. The first side cover 21 may be bent in a downward direction (on a z-axis line) to face the light input surface 16 on the top of the first part 15b.

The second side cover 22 faces the bottom of the first part 15b. The second side cover 22 may be bent in an upward direction (on the z-axis line) to face the light input surface 16 on the bottom of the first part 15b. A part 22a of the second side cover 22 may be inclined on the bottom of the light guide plate 15, that is, a part of an inclined plane and the light source 13 may be received in the second side cover 22.

The first side cover 21 and the second side cover 22 are joined to each other by a first fixation member 51 to prevent the light source 13 and the light guide plate 15 from wobbling due to an external impact, in particular, to prevent the source 13 and the light guide plate 15 from wobbling in a z-axis direction.

The second side cover 22 may maintain an arrangement state of the light guide plate 15 and the light source 13 solidly by supporting the inclined plane of the light guide plate 15 and protect the light guide plate 15 and the light source 13 from the external impact.

A first hole 41 may be formed at positions of the first side cover 21 corresponding to the projection 30 of the first part 15b and the first hole 41 may be larger than the projection 30 to catch the projection 30. Meanwhile, the circumference of the first hole 41 may be spaced from a partial edge of the caught projection 30 by a predetermined gap. The gap space may be a margin for preventing deformation of the light guide plate 15 when the light guide plate 15 is expanded due to a change of external environment, i.e., a rapid increase in temperature. At this time, the other portion of the projection 30 may be in contact with the circumference of the hole 41 in order to improve fixation force.

At least one second hole 42 may further be formed in the first side cover 21. At least one third hole 43 may be formed at a position corresponding to the second hole 42 in the second side cover 21.

The second and third holes 42 and 43 are disposed on a straight line in the z-axis direction. The first fixation member 51 is inserted into the holes to solidly fix the first side cover 21 and the second side cover 22. In order to ensure the fixation force, at least two pairs constituted by the second and third holes 42 and t43 may be formed in one optical assembly 10. The second hole 42 and the third hole 43 may be formed at any positions of the first side cover 21 and the second side cover 22, respectively.

In the first side cover 21, the second hole 42 may be disposed together with the first hole 41 on the straight line in the y-axis direction. In this case, the first side cover 21 and the second side cover 22 may be more solidly fixed by combination force between the light guide plate 15 and the first side cover 21 by the first hole 41 and the projection 30 of the light guide plate 15 and combination force between the first side cover 21 and the second side cover 22 by the second and third holes 42 and 43 and the first fixation member 51. Of course, the positions of the holes and the projection are not limited thereto and the holes and the projection may be positioned at any location capable of providing the combination force between the light guide plate 15 and the side cover 20.

That is, each of the second and third holes is formed on the side of the first side cover 21 and the second side cover 22 superimposed on each other, such that the fixation member may be inserted in the y-axis direction into the holes.

Meanwhile, a fourth hole 44 and a fifth hole 45 which a second fixation member 52 (see FIG. 10) for fixing the optical assembly 10 to the bottom cover 110 penetrates may be further formed in the first side cover 21 and the second side cover 22.

The rest part of the optical assembly 10 excluding the second part 15a of the light guide plate 15 is a first region not substantially providing light to the display panel. The width of the first region may be further reduced by the arrangement relationship of a first hole 41, a second hole 42, and a third hole 43.

For example, the width of the first region can be reduced in a case in which the second hole 42 and the third hole 43 are disposed between the light emitting diodes 11 rather than a case in which the second hole 42 and the third hole 43 are disposed in the rear of the light emitting diodes 11.

Herein, the first hole 41, the second hole 42, and the third hole 43 formed in the side cover 20 of the optical assembly 10 may have various shapes. The shapes are not limited to the shown shapes.

The first fixation member 51 may be a screw or a fixation pin, but is not limited thereto. In the case in which the fixation member 51 is the screw, a summit and a valley may be formed along a thread on inner surfaces of the second and third holes 42 and 43. Therefore, the fixation member 51 pivots with being caught in the second hole 42 and the third hole 43 to fasten and fix the light guide plate 15 and the light source 13 which fit therebetween.

In order to ensure a pitch of the summit formed on the inner surfaces of the second hole 42 and the third hole 43, the thicknesses of portions adjacent to the peripheries of the second hole 42 and the third hole 43 in the first and second side covers 21 and 22 are larger than other portions or the peripheral portions may use an additional member.

The backlight unit 100 manufactured as described above may be received in a box-shaped bottom cover of which the top is opened.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, components specifically described in the embodiment of the present invention can be modified. In addition, it should be appreciated that differences related to the modification and application fall within the scope of the present invention, which is prescribed in the appended claims.

What is claimed is:

1. A display device comprising:
    a backlight unit that is divided into a plurality of blocks and is driven with each of the divided blocks as a unit, and includes a plurality of optical assemblies;
    a display panel positioned over the backlight unit;
    a controller that outputs local dimming values corresponding to brightness of the blocks of the backlight unit, in accordance with an image displayed in the display panel;
    a BLU driver that controls the brightness of the blocks of the backlight unit using the local dimming values,
    wherein each of the optical assemblies includes:
        a substrate;
        a plurality of light sources that are positioned on the substrate and that emit light;
        a light guide plate that comprises a light input unit including an incident surface into which light is inputted laterally from at least one of the light sources and a light emitting unit emitting the inputted light upward;
        a reflection member disposed below the light guide plate; and
        a side cover to which the substrate, the light guide plate and the reflection member are fixed, the side cover including a first side cover and a second side cover that are combined with each other, the first side cover being disposed above the second side cover to cover the light sources, and a part of the second side cover being inclined on the bottom of the light guide plate,
    wherein the light guide plate includes:
        a first part having the incident surface, the first part projecting from a lower portion of a side of the light guide plate; and at least one projection disposed between the light sources and projecting from a top of the first part by a predetermined height for being caught by the first side cover, wherein the backlight unit includes a plurality of substrates which are separated to correspond to the plurality of optical assemblies, wherein the plurality of optical assemblies are respectively fixed to a bottom cover of a display module by using the side cover included in each of the optical assemblies, wherein the BLU driver receives the local dimming values and outputs a plurality of driving signals, and wherein the blocks of the backlight unit are divided into a plurality of scan groups and are driven with each of the divided scan groups as a unit.

2. The display device of claim 1, wherein the BLU driver receives the local dimming value for at least one block belonging to one of the scan groups and information on a scan time when the one of the scan groups is scanned from the controller.

3. The display device of claim 2, wherein the information on the scan time is a delay time up to a time when the one of the scan groups is scanned from a time when a vertical synchronization signal is inputted.

4. The display device of claim 2, wherein the information on the scan time is a scan start signal indicating the time when the one of the scan groups is scanned.

5. The display device of claim 1, wherein the numbers of blocks belonging to at least two scan groups of the plurality of scan groups are different from each other.

6. The display device of claim 1, wherein the plurality of driving signals outputted from the BLU driver controls the brightness of two or more blocks among the blocks of the backlight unit.

7. The display device of claim 1, wherein the display panel is divided into a plurality of regions and the controller controls the brightness of the block of the backlight unit corresponding to the region depending on the brightness of each of the regions of the display panel.

8. The display device of claim 1, wherein the BLU driver receives the local dimming values for each block from the controller by using a serial peripheral interface (SPI) communication.

9. The display device of claim 1, wherein a light emitting surface of at least one of the light sources is formed in a direction crossing the substrate.

10. The display device of claim 9, wherein at least a portion of the light emitting unit of a first light guide plate of two adjacent light guide plates is disposed on top of the light input unit of a second light guide plate.

11. The display device of claim 1, wherein the light emitting unit of the light guide plate includes a part of which a thickness is gradually reduced from one portion adjacent to the light input unit to the other side.

12. A display device, comprising:
a backlight unit that is divided into a plurality of blocks and is driven with each of the divided block as a unit, and includes a plurality of optical assemblies;
a display panel positioned over the backlight unit;
a controller that outputs local dimming values corresponding to brightness of the blocks of the backlight unit, in accordance with an image displayed in the display panel; and
a BLU driver that controls the brightness of the blocks of the backlight unit using the local dimming values, wherein each of the optical assemblies includes:
a plurality of light sources;
a light guide plate that comprises a light input unit including an incident surface into which light is inputted laterally from at least one of the light sources and a light emitting unit emitting the inputted light upward;
a reflection member disposed below the light guide plate; and
a side cover to which the light guide plate and the reflection member are fixed, the side cover including a first side cover and a second side cover that are combined with each other, the first side cover being disposed above the second side cover to cover the light sources, and a part of the second side cover being inclined on the bottom of the light guide plate, wherein the light guide plate includes:
a first part having the incident surface, the first part projecting from a lower portion of a side of the light guide plate; and
at least one projection disposed between the light sources and projecting from a top of the first part by a predetermined height for being caught by the first side cover, wherein the plurality of optical assemblies are respectively fixed to a bottom cover of a display module by using the side cover included in each of the optical assemblies, wherein the blocks of the backlight unit are divided into a plurality of scan groups and are driven with each of the divided scan groups as a unit, wherein the BLU driver includes a driving unit, and wherein the driving unit includes a control unit receiving the local dimming values for each block from the controller, and a plurality of driver ICs outputting a driving signal for controlling the brightness of two or more blocks of the backlight unit.

13. The display device of claim 12, wherein the control unit, in parallel, outputs the local dimming values for each block inputted in series, and transmits the values to each of the plurality of driver ICs.

14. The display device of claim 12, wherein a driver IC of the plurality of drivers ICs supplies the driving signal to the light sources included in n blocks by using n channels.

15. The display device of claim 12, wherein the BLU driver includes a plurality of driving units.

16. The display device of claim 12, wherein a light emitting surface of at least one of the light sources is formed in a direction crossing a substrate on which the light sources are positioned.

17. A display device, comprising:
a backlight unit that is divided into a plurality of blocks and is driven with each of the divided block as a unit, and includes a plurality of optical assemblies;
a display panel positioned over the backlight unit;
a controller that outputs local dimming values corresponding to brightness of the blocks of the backlight unit, in accordance with an image displayed in the display panel; and
a BLU driver that controls the brightness of the blocks of the backlight unit using the local dimming values, wherein each of the optical assemblies includes:
a substrate;
a plurality of light sources that are positioned on the substrate, and emit light;
a light guide plate that comprises a light input unit including an incident surface into which light is inputted laterally from at least one of the light sources and a light emitting unit emitting the inputted light upward;

a reflection member disposed below the light guide plate; and a side cover to which the substrate, the light guide plate and the reflection member are fixed, the side cover including a first side cover and a second side cover that are combined with each other, the first side cover being disposed above the second side cover to cover the light sources, and a part of the second side cover being inclined on the bottom of the light guide plate, wherein the light guide plate includes:

a first part having the incident surface, the first part projecting from a lower portion of a side of the light guide plate; and at least one projection disposed between the light sources and projecting from a top of the first part by a predetermined height for being caught by the first side cover, wherein the light guide plate includes a part of which a thickness is gradually reduced from one portion to the other portion, wherein the backlight unit includes a plurality of substrates which are separated to correspond to the plurality of optical assemblies, wherein the plurality of optical assemblies are respectively fixed to a bottom cover of a display module by using the side cover included in each of the optical assemblies, wherein the BLU driver receives the local dimming values for each block and outputs a plurality of driving signals, and wherein the blocks of the backlight unit are divided into a plurality of scan groups and are driven with each of the divided scan groups as a unit.

18. The display device of claim 17, wherein a light emitting surface of at least one of the light sources is formed in a direction crossing the substrate.

* * * * *